US012636873B2

(12) United States Patent
Moser et al.

(10) Patent No.: US 12,636,873 B2
(45) Date of Patent: May 26, 2026

(54) DEVICE AND METHOD FOR PEELING OFF PROTECTIVE FILMS FROM PLATE-SHAPED OBJECTS

(71) Applicant: Advanced Engineering Industrie Automation GmbH, Neualm (AT)

(72) Inventors: Lukas Moser, Annaberg (AT); Tim Moser, Annaberg (AT)

(73) Assignee: Advanced Engineering Industrie Automation GmbH, Neualm (AT)

( * ) Notice: Subject to any disclaimer, the term of this patent is extended or adjusted under 35 U.S.C. 154(b) by 216 days.

(21) Appl. No.: 18/393,885

(22) Filed: Dec. 22, 2023

(65) Prior Publication Data

US 2024/0208199 A1     Jun. 27, 2024

(30) Foreign Application Priority Data

Dec. 22, 2022    (DE) ..................... 10 2022 134 515.7

(51) Int. Cl.
    *B32B 43/00*          (2006.01)
(52) U.S. Cl.
    CPC ....... *B32B 43/006* (2013.01); *Y10T 156/1174* (2015.01); *Y10T 156/195* (2015.01)
(58) Field of Classification Search
    CPC ............. B32B 43/006; Y10T 156/1174; Y10T 156/195
    See application file for complete search history.

(56) References Cited

U.S. PATENT DOCUMENTS

| | | | | |
|---|---|---|---|---|
| 5,006,190 | A * | 4/1991 | Earle ................... | B29C 63/0013 |
| | | | | 156/247 |
| 5,009,735 | A * | 4/1991 | Ametani ............. | B29C 63/0013 |
| | | | | 156/716 |
| 5,891,298 | A * | 4/1999 | Kuroda ............. | H01L 21/67132 |
| | | | | 156/289 |
| 7,846,289 | B2 * | 12/2010 | Tsujimoto ......... | H01L 21/68714 |
| | | | | 156/247 |
| 8,052,824 | B2 * | 11/2011 | Kanazawa ........ | H01L 21/67132 |
| | | | | 156/289 |
| 8,137,417 | B2 * | 3/2012 | Eguchi .................. | G02F 1/1303 |
| | | | | 29/25.01 |
| 8,182,632 | B2 * | 5/2012 | Kino ................. | H01L 21/67132 |
| | | | | 156/289 |

(Continued)

FOREIGN PATENT DOCUMENTS

| | | |
|---|---|---|
| DE | 10296951 B4 | 11/2005 |
| DE | 102014011721 A1 | 2/2016 |

(Continued)

*Primary Examiner* — Philip C Tucker
*Assistant Examiner* — Nikolas R Harm
(74) *Attorney, Agent, or Firm* — FisherBroyles, LLP; Roger L. Browdy; Ronni S. Jillions

(57)          ABSTRACT
A device for peeling off at least one protective film from a plate-shaped object, a detachment device with at least one roller exerting a pressure force on the protective film in the edge region of the plate-shaped object and thereby detaches the protective film, the protective film being at least partially lifted from the plate-shaped object with at least one adhesive tape and taken up by at least one drum in rotating motion, wherein the device has at least one swiveling contact arm and a stamp arranged thereon having a stamp surface for applying the adhesive tape.

10 Claims, 6 Drawing Sheets

(56)          References Cited

Figure 1:
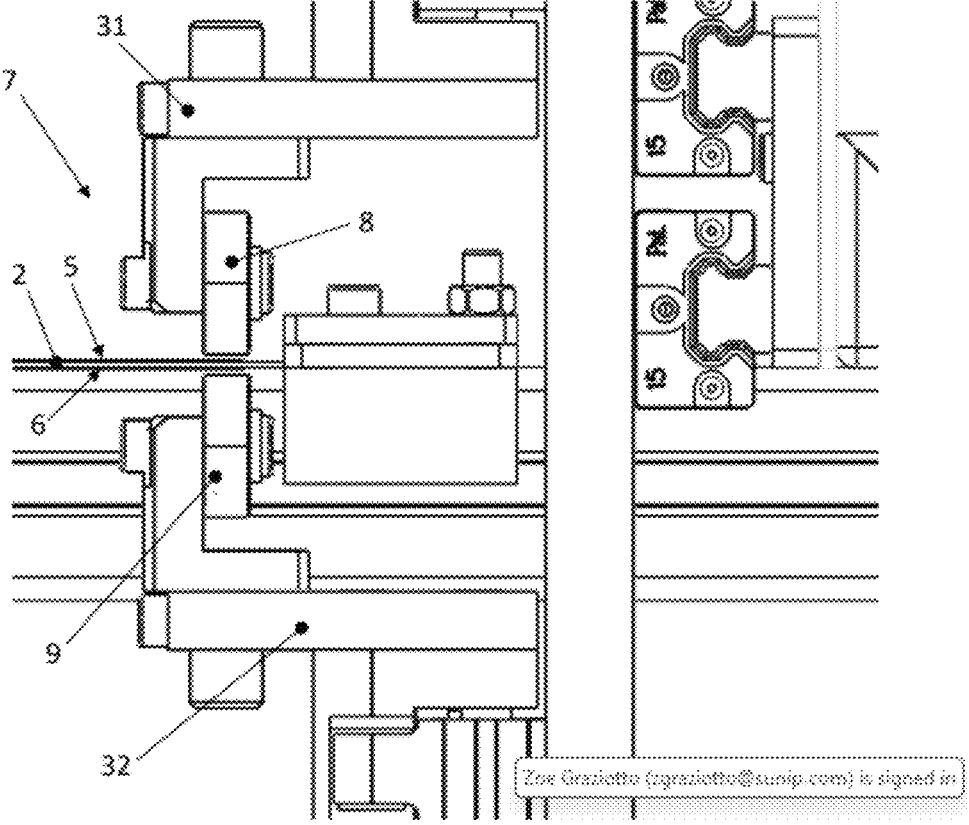

U.S. PATENT DOCUMENTS 8,449,710 B2 *   5/2013  Furuya ................. B32B 43/006
                                                    156/247
2008/0216955 A1 *  9/2008  Neeper .................... B67B 7/00
                                                    156/759

FOREIGN PATENT DOCUMENTS

| EP | 1128415 | B1 | 7/2010 |
| JP | H0687959 | A | 3/1994 |
| JP | H06278936 | A | 10/1994 |
| JP | 2006347756 | A | 12/2006 |
| JP | 2016011171 | A | 1/2016 |
| JP | 2021104889 | A | 7/2021 |
| KR | 1020040083579 | A | 10/2004 |
| KR | 1020150049100 | A | 5/2015 |
| TW | 486924 | B | 5/2002 |
| TW | M318587 | U | 9/2007 |
| TW | 201608946 | A | 3/2016 |
| WO | 2017038468 | A1 | 3/2017 |

* cited by examiner

DEVICE AND METHOD FOR PEELING OFF PROTECTIVE FILMS FROM PLATE-SHAPED OBJECTS

The invention relates to a device and method for peeling off protective films from plate-shaped objects.

Such a protective film is used, for example, in the production of printed circuit boards (PCBs) or glass or ceramic surfaces. The protective films are designed as a self-adhesive film or as a statically adhesive film without adhesive. When producing glass, such a film serves as protection against scratches or contamination during processing, storage and transport.

It is well-known, when producing PCBs, to laminate photopolymer layers with protective films fully automatically on both sides of copper-clad PCB substrates using so-called cut-sheet laminators. In this case, trimmed photopolymer layers are applied to copper-clad PCB substrates with a protective film spaced from the edge. The film preferably is at a distance from the edge of between 0.5 mm and 15 mm. However, the protective film must be removed from the PCB during the processing procedure.

Up until now, fully automatic systems have laminated the photopolymer layer with the protective film and also have been able to remove the protective film. However, no good result was achieved when removing the film. In particular, peeling off the protective film from the photopolymer layer after the exposure process poses a problem.

DE 10 2014 011 721 A1 discloses a device and method for peeling off protective films, wherein a PCB with the protective films applied thereon is fed into the roller nip of a peeling unit and wedge-shaped swords engage between the PCB and the protective films and detach the protective films from the PCB. The detached protective films are carried by a drum in rotating motion, with air nozzles in front of the swords, which generate an air flow and place the detached part of the protective film on the outer circumference of the drum.

Since the peeling-off process takes place in a clean room, the air flow generated has a disadvantageous effect as it leads to undesirable turbulences. Furthermore, there is the problem of PET support films adhering very strongly to the ABF and, especially at the edges, are almost melted into the ABF due to the high rigidity and high temperature stability of the PET support films and are therefore difficult to detach with a stream of air.

A large number of components are necessary for the production of processors and graphics chips. An important one is the Ajinomoto Build-up Film (ABF), which is used as an insulating film for carriers to place the chips on the actual circuit board. The carrier leads the contacts of the die to the outside so that they can be addressed. The insulating film, especially the Ajinomoto Build-up Film, must meet high requirements, such as, for example, a uniform insulation layer, high heat resistance even with strong temperature fluctuations, and high mechanical stability.

Devices and methods for peeling off such an Ajinomoto Build-up Film (ABF) are already known from the prior art, which film must be peeled off according to the vacuum lamination procedure on PCB inner layers and cooling to room temperature.

KR 1020150049100 A discloses a peeling-off method for a protective film, wherein the protective film is first processed with a film detachment device, which is designed as a knurling roller, and then connected to a peeling-off tape in the front end section and removed from the plate-shaped object.

EP 1 128 415 B2 discloses a film removal device which removes a film from a plate-shaped element using an adhesive tape, the adhesive tape being connected to the edge section by a hot pressing process with a connecting device and then being peeled off obliquely upwardly using a pulling device.

The known peeling-off methods only partially work well and can only be automated to a limited extent.

The invention is therefore based on the object of developing a device and a method for peeling-off a protective film in such a way that the automated peeling-off process is improved.

To achieve the object, a device is provided for peeling off at least one protective film from a plate-shaped object, a detachment device with at least one roller exerting a pressure force on the protective film in the edge region of the plate-shaped object and thereby detaches the protective film, the protective film being at least partially lifted from the plate-shaped object with at least one adhesive tape and taken up by at least one drum in rotating motion, wherein the device has at least one swiveling contact arm and a stamp arranged thereon having a stamp surface for applying the adhesive tape. A method is also provided for peeling off at least one protective film from a plate-shaped object, the detached protective film being received by at least one drum, including the following steps:

lowering a contact arm with a stamp swivel-mounted thereon having a stamp surface in the direction of the plate-shaped object;

swiveling out the stamp until the stamp surface is parallel to the surface of the plate-shaped object, an adhesive tape being applied to the stamp surface when the stamp is swiveled out;

placing the stamp on the protective film of the plate-shaped object and thus making surface contact of the adhesive tape with the protective film;

swiveling in the stamp;

raising the contact arm at a defined distance from the plate-shaped object, the protective film adhering to the adhesive tape and being lifted from the plate-shaped object;

gripping the detached protective film with at least one gripper of a clamping device;

transferring the released protective film from the clamping device to the drum, which peels off the protective film from the plate-shaped object.

An essential feature of the invention is that, for applying the adhesive tape, the device has at least one swiveling contact arm and a stamp arranged thereon having a stamp surface.

The term application refers to all processes that are necessary to bring into contact the adhesive tape with the protective film and to at least partially lift or take off the protective film from the plate-shaped object by means of the adhesive tape.

In a first preferred embodiment, the device for detaching the protective film has at least one swiveling contact arm and a stamp swivel-mounted thereon. The stamp is used to make surface contact between an adhesive tape and the protective film and supports easier detachment of the protective films from the plate-shaped object. By means of a drive, the contact arm together with the stamp can be placed on the surface of the plate-shaped object with the protective film with a defined pressure and moved away from it.

An adhesive tape is understood to mean a strip-shaped carrier material that is coated on one or both sides with adhesive. The adhesive tape is adapted to the respective protective film in terms of adhesion, cohesion and stickiness.

The adhesive tape is located in a first adhesive tape dispenser and can be dispensed in a controlled manner. The adhesive tape dispenser is designed, for example, as a roll or adhesive tape roller device. Targeted, controlled delivery is understood to mean that the adhesive tape is either kept under tension or delivered at a certain speed. The desired delivery is controlled and coordinated with the swiveling stamp.

The adhesive tape is preferably located on a first adhesive tape dispenser and is guided to an adhesive tape collector via the stamp. Both the adhesive tape dispenser and the adhesive tape collector can be embodied as rollers, so that the adhesive tape is unrolled from the first roller and rolled up again from the second roller.

The contact arm preferably has a contact head, which is initially lowered in the direction of the plate-shaped object and held at a certain distance from the plate-shaped object. The stamp is then swiveled out of the contact head, the swiveling out of the stamp generating a tensile force on the adhesive tape, so that further adhesive tape is dispensed from the first adhesive tape dispenser. Ideally, the stamp surface of the stamp is completely covered with the adhesive tape. The stamp is preferably swiveled out to such an extent that the stamp surface is parallel to the surface of the plate-shaped object. The contact arm is then lowered further until the stamp surface with the adhesive tape rests completely on the protective film. The adhesive tape now adheres to the protective film.

The stamp is then swiveled in, with the adhesive tape still adhering to the protective film. By first raising the contact arm by a defined distance, the protective film is released from the plate-shaped object. The adhesive tape is then rolled up by the adhesive tape collector, with the adhesive tape being led away upwards to the adhesive tape collector via a roller provided for this purpose on the contact head.

By leading away the adhesive tape upwards, the protective film is released from the plate-shaped object in a defined manner. Preferably, at the same time, the adhesive tape dispenser blocks further delivery or feeding of the adhesive tape, so that, under tensile stress, the adhesive tape again makes surface contact with the stamp surface of the swiveled-up stamp. The contact arm is still located at a defined distance above the plate-shaped object. The protective film is peeled off from the plate-shaped object at least in the edge region.

In a preferred embodiment, the device for detaching the protective film has a clamping device with at least one gripper for gripping and clamping the detached protective film. Preferably, there are two spaced, opposite grippers at a defined height, each in the edge region of the plate-shaped object, so that the detached protective film is clamped on both sides by the grippers.

The clamping device is arranged in the area of at least one (peel-off) drum, which receives the detached protective film from the grippers and further peels it off from the plate-shaped object. The drum picks up the protective film using the grippers of the clamping device. It is also possible for vacuum suction to create a vacuum in the area of the drum and hold the detached protective film on the surface of the drum.

In a preferred embodiment, the clamping device has two spaced grippers which are located on both sides of the drum. The grippers are used to grip and hold the detached protective film and release the detached protective film to the drum. The grippers are controlled by a drive located outside the drum. The drive for the grippers is designed, for example, as a (working) cylinder, which transmits its linear force to a slide guide and thereby generates rotational motion. The rotational motion is transmitted to a shaft which extends through the drum. The gripper has a toggle lever device, with the gripper being opened or closed when the shaft is in rotating motion. The present embodiment with a rotating shaft through the drum has the significant advantage that no movable components have to be arranged in or in the area of the drum. The rotational motion of the shaft can be generated at a distance from the drum, so that no drive units are necessary for the motion of the grippers in the area of the drum.

The present patent application not only claims protection for a device for detaching the protective film using a contact arm and a swiveling stamp, but also a combination with the contact arm and a detachment device with which the protective film is released first in the edge region of the plate-shaped object.

In a preferred embodiment, the device for detaching the protective film has a detachment device with which the edge of the protective film is mechanically loosened from the plate-shaped object. The detachment device is preferably designed as a knurling or rolling device, with a roller being pressed against the edge of the plate-shaped object and rolled and a compressive force being transmitted to the plate-shaped object. This means that pressure forming takes place in the edge region of the plate-shaped object, which causes the protective film to become "stressed" and thus detaches in the edge region. Such a release of the film is advantageous in order to then pick up the protective film with the contact arm and the stamp swivel-mounted thereon using the adhesive tape.

The detachment device preferably has at least one inclined, smooth roller. The roller is arranged, for example, at an angle of approx. 5-30° to the travel axis. By arranging the roller at an angle to the feed motion and by a defined pressure force on the roller, the protective film is released in this area when the roller moves on the plate-shaped object along the edge region.

In a further preferred embodiment, at least one holding device holds the plate-shaped object during the detachment process.

In addition to the above-mentioned device for detaching the protective film, the present patent application also claims protection for a method for detaching a protective film from a plate-shaped object.

In a preferred embodiment, the method for detaching a protective film from a plate-shaped object has the following method steps:

lowering a contact arm with a contact head and a stamp swivel-mounted thereon in the direction of the plate-shaped object;

swiveling out the stamp from the contact head until the stamp surface is parallel to the surface of the plate-shaped object, the adhesive tape being applied to the stamp surface when the stamp is swiveled out;

placing the stamp on the protective film of the plate-shaped object and thus making surface contact of the adhesive tape with the protective film;

swiveling in the stamp in the contact head;

raising the contact arm at a defined distance from the plate-shaped object, the protective film being simultaneously lifted from the plate-shaped object;

pulling in the adhesive tape through an adhesive tape collector via a roller at the contact head;

gripping the detached protective film with at least one gripper of a clamping device;

transferring the released protective film from the clamping device to a drum, which peels off further protective film from the plate-shaped object.

In a further preferred embodiment, the adhesive tape dispenser and the adhesive tape collector are controlled. For example, the adhesive tape dispenser can be locked while the protective film is being detached from the plate-shaped object, so that no further adhesive tape is added while the adhesive tape collector pulls in the adhesive tape that has already been used.

The subject matter of the present invention arises not only from the subject matter of the individual claims, but also from the combination of the individual claims with one another.

All information and features disclosed in the documents, including the abstract, in particular the spatial configuration shown in the drawings, are claimed to be essential to the invention to the extent that they are novel, individually or in combination, compared to the prior art.

The invention is explained in more detail below with reference to drawings showing only one embodiment. The drawings and their description reveal further features and advantages of the invention that are essential to the invention.

Figure 2:
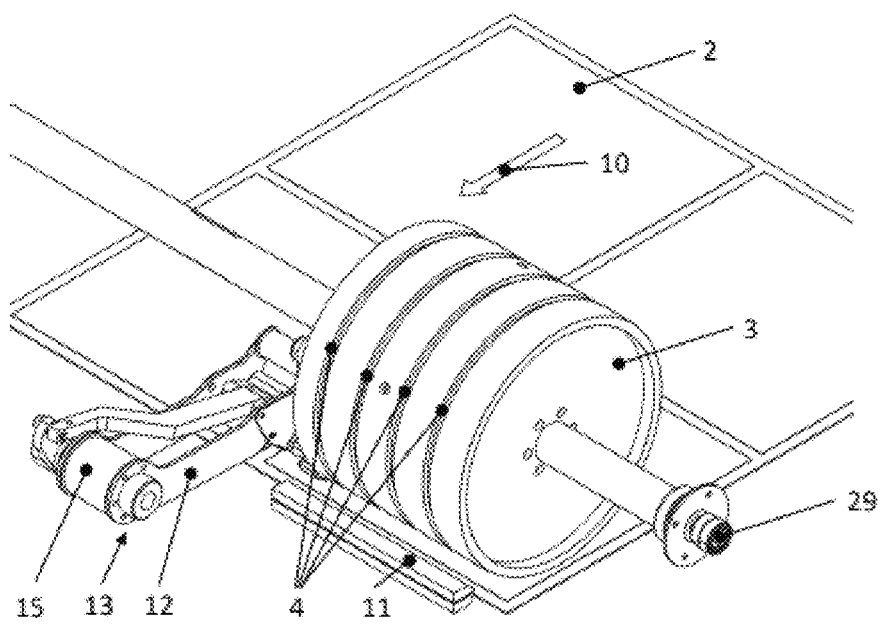
Figure 3:
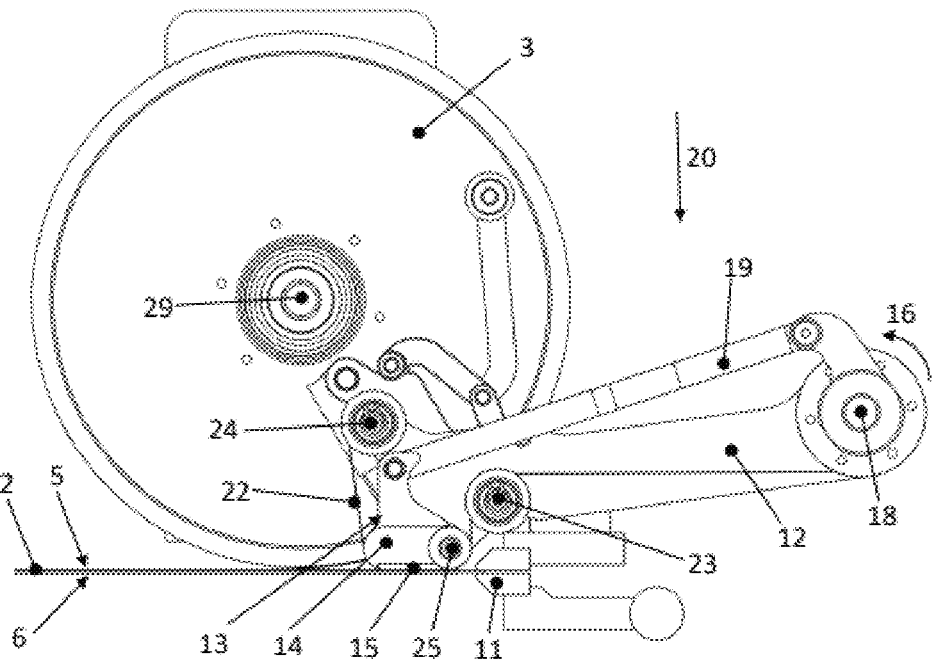
Figure 4:
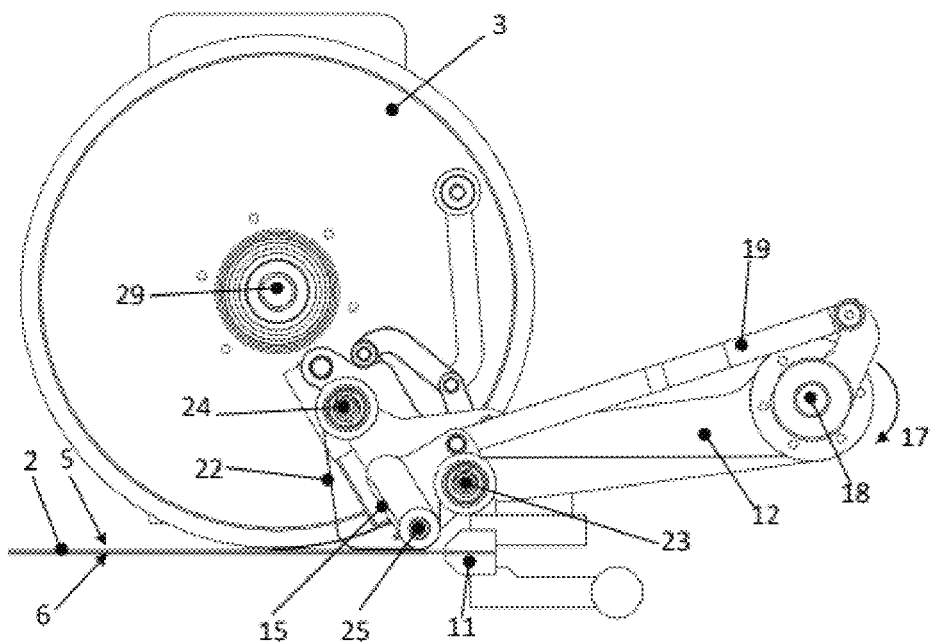
Figure 5:
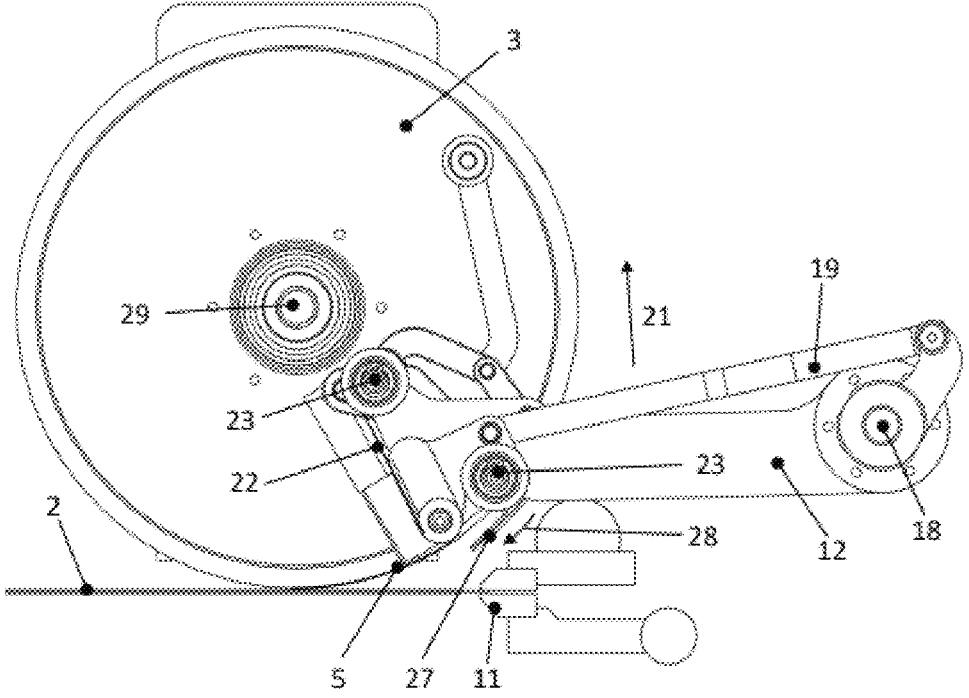
Figure 6:
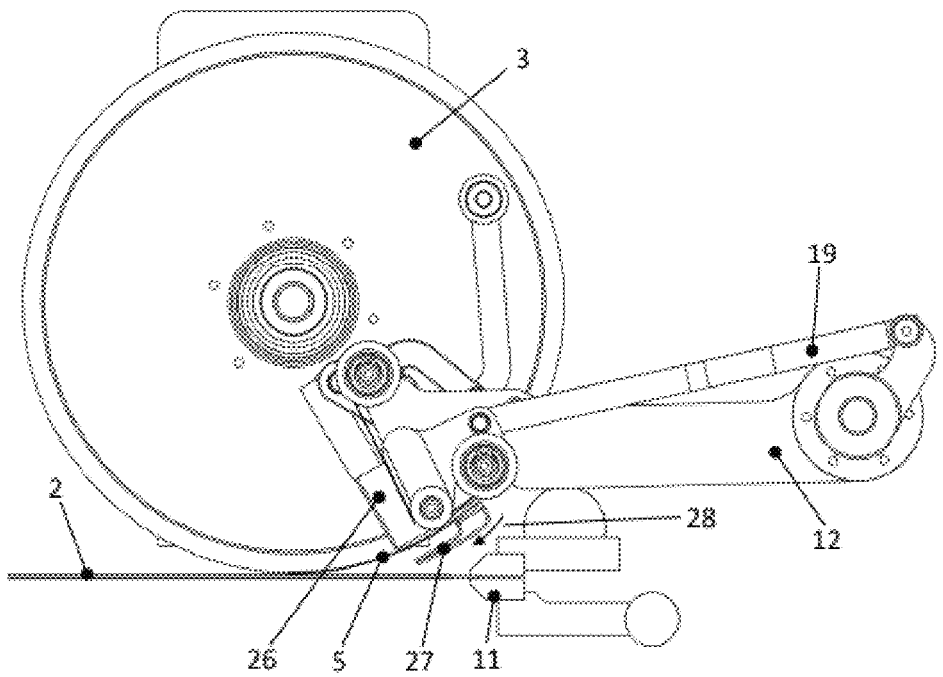
Figure 7:
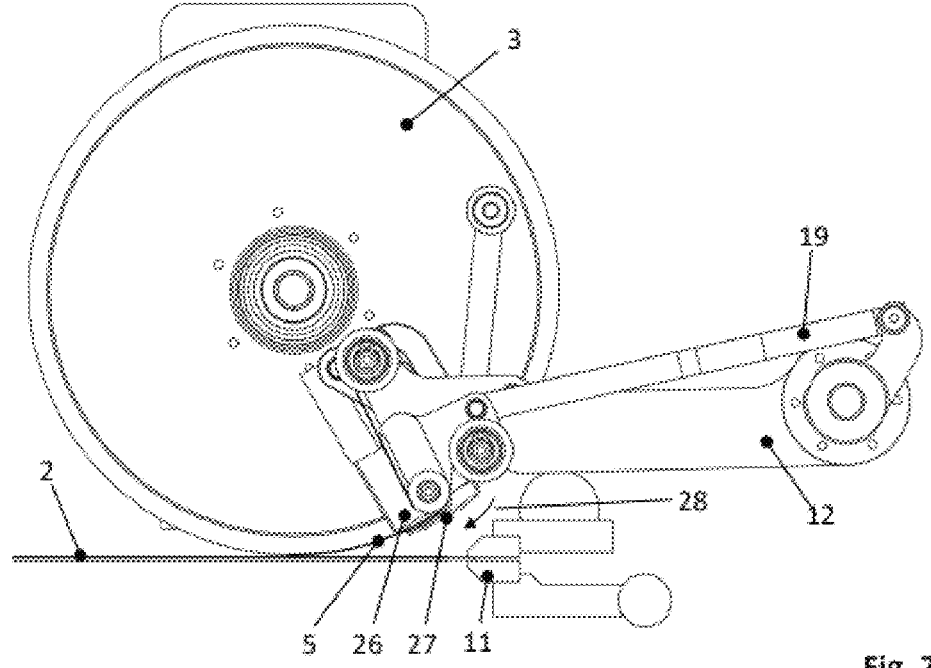
Figure 8:
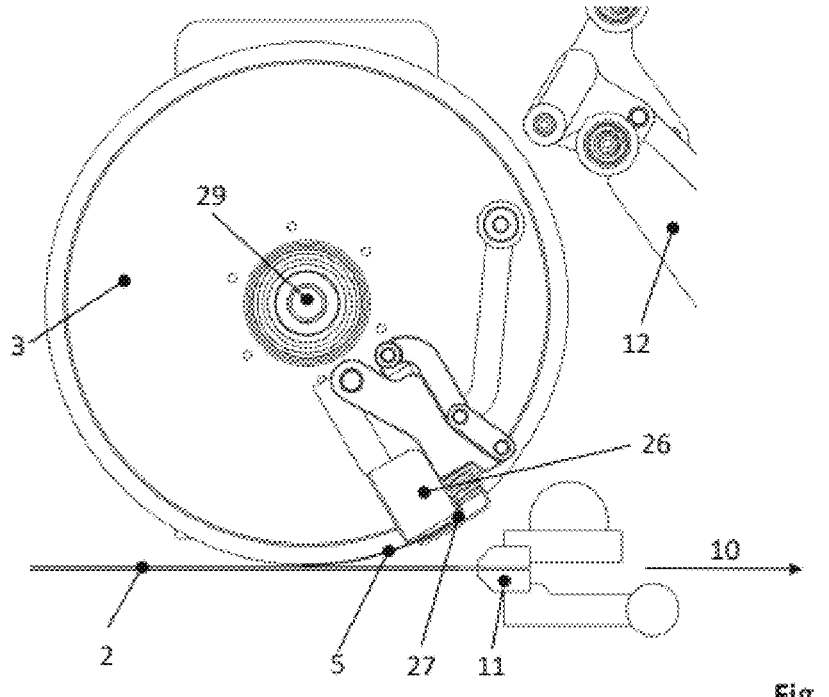
Figure 9:
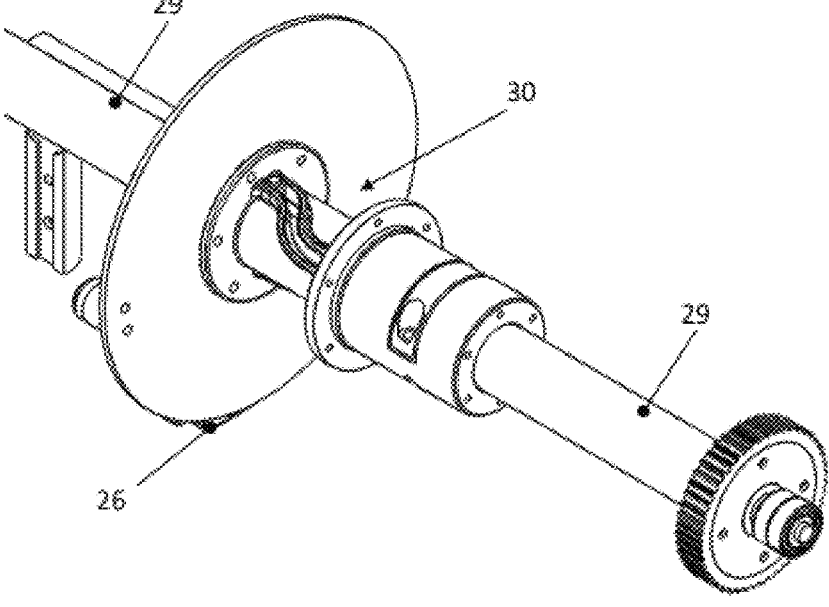
Figure 10:
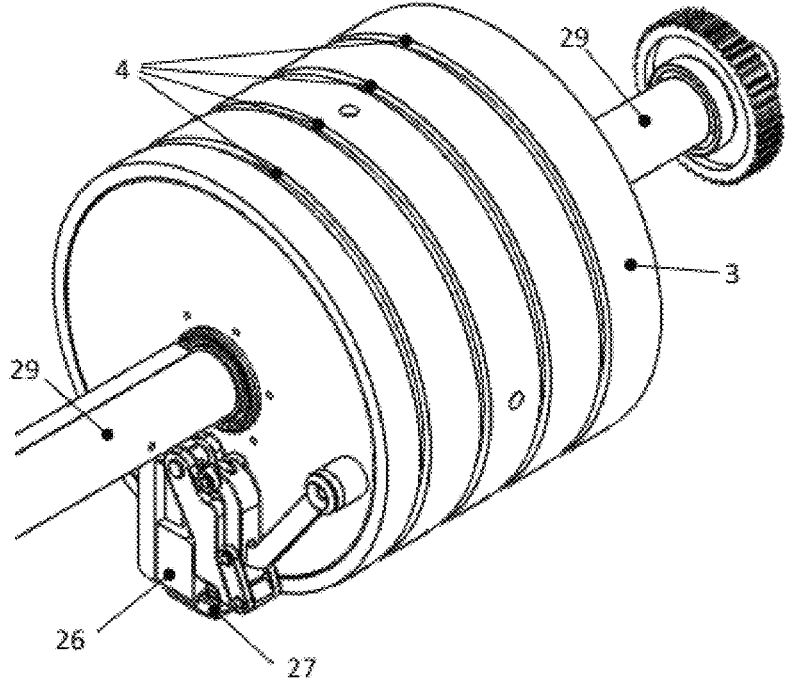

In the drawings:

FIG. 1: shows a schematic representation of the detachment device;

FIG. 2: shows a perspective representation of the device according to the invention with a plate-shaped object;

FIG. 3: shows a schematic side view of the device according to the invention with lowered contact arm;

FIG. 4: shows a schematic side view of the device according to the invention with lowered contact arm and swiveled stamp surface;

FIG. 5: shows a schematic side view of the device according to the invention with raised contact arm and released protective film;

FIG. 6: shows a schematic side view of the device according to the invention with raised contact arm and swiveled gripper of the clamping device;

FIG. 7: shows a schematic side view of the device according to the invention with raised contact arm and clamped protective film;

FIG. 8: shows a schematic side view of the device according to the invention with the protective film received by the drum;

FIG. 9: shows a schematic representation of the shaft of the clamping device;

FIG. 10: shows a schematic representation of the clamping device.

FIG. 1 shows detachment device 7 for detaching the protective films 5 and 6. The first protective film 5 is located at the top of plate-shaped object 2 and the second protective film 6 is located at the bottom of plate-shaped object 2. Plate-shaped object 2 is clamped by a holding device 33.

Below, the device according to the invention for detaching a protective film is shown only by a drum 3, which detaches and receives upper protective film 5. However, the invention is not limited thereto. Of course, at least one further, swiveling contact arm 12 and at least one further drum 3 can also be arranged at the bottom of plate-shaped object 2, which detach and receive bottom-side protective film 6.

Detachment device 7 is arranged in the area of drum 3 and consists of a first movable arm 31, on which a roller 8 is rotatably arranged, and an opposite, second movable arm 32, on which a second roller 9 is rotatably arranged. In order to detach the protective films 5, 6 from plate-shaped object 2, plate-shaped object 2 is arranged between the two rollers 8, 9. The two rollers 8, 9 can be moved apart by a vertical motion of the arms 31, 32 for receiving plate-shaped object 2.

The detachment process of the two protective films 5, 6 is preferably only carried out in the edge region of plate-shaped object 2. Consequently, plate-shaped object 2 is pushed into detachment device 7 and clamped with holding device 33 until the two rollers 8, 9 can be placed on the edge region of the protective films 5, 6.

In order to release the protective films 5, 6 from plate-shaped object 2, the rollers 8, 9 are placed on plate-shaped object 2 and exert a defined pressure force (contact force) in the z-direction, with the direction of motion being in the x-direction.

The two rollers 8, 9 have a smooth surface. The two rollers are arranged on the arms 31 and 32 at a right angle to the direction of motion, so that longitudinal rolling takes place in this embodiment.

However, the two rollers 8, 9 can also be inclined. This means that the two rollers 8, 9 are set at an angle, with a tangential pressure force and a motion of the rollers 8, 9 in the longitudinal direction, i. e. parallel to the front edge of plate-shaped object 2, causing friction on the protective film (5, 6). In this case, the plate-shaped object 2 undergoes simultaneously a longitudinal and a rotational motion due to the friction with the rollers 8, 9, as a result of which the protective films 5, 6 are stressed and thereby detach from plate-shaped object 2 in the edge region.

FIG. 2 shows device 1 according to the invention for detaching protective films 5, 6 from a plate-shaped object 2. The feed motion of plate-shaped object 2 is shown in the direction of arrow 10. Device 1 has a driven drum 3 for receiving the protective films 5, 6 of plate-shaped object 2. Drum 3 has a drum surface with grooves 4 into which air is blown. This creates a negative pressure and the detached protective film adheres to the drum surface. In the area of drum 3 there is a swiveling contact arm 12 with a contact head 13. Holding device 11 is located downstream of the drum and fixes plate-shaped object 2.

FIG. 3 shows device 1 according to the invention in a side view. Contact arm 12 has its own drive and is rotatably mounted about an axis 18. According to FIG. 3, contact arm 12 was swiveled with a rotary motion 16 in the direction of plate-shaped object 2. Contact arm 12 is mechanically coupled to rod system 19 and stamp 14. Rod system 19 also has its own drive.

Contact arm 12 has a contact head 13 with a stamp 14 and a stamp surface 15 at its front end. The contact head with stamp 14 serves to contact adhesive tape 22 with protective film 5, 6 of plate-shaped object 2 and is swivel-mounted on contact arm 12. The swiveling motion of contact head 13 with stamp 14 takes place via a rod system 19, which is connected to a drive.

A motion of rod system 19 causes stamp 14 to swivel about a deflection roller 25. The swiveling motion thus causes stamp surface 15 to rest either completely or only partially on the surface of protective film 5, 6 of plate-shaped object 2. For example, partial resting is understood to mean only contact between stamp 14 and protective film 5, 6 in the area of deflection roller 25.

In the area of contact arm 12 there is a deflection roller 23 of the adhesive tape dispenser, which provides new adhesive tape 22 for the detachment process. Adhesive tape 22 is guided from the adhesive tape dispenser via deflection rollers 23, 25 and stamp surface 15 via deflection roller 24 to the adhesive tape collector, which collects used adhesive tape 22. The adhesive tape dispenser and the adhesive tape collector are designed as rollers which unroll and reroll adhesive tape 22.

According to FIG. 3, stamp 14 is located with its entire stamp surface 15 on the upper protective film 5, with adhesive tape 22 being located between stamp surface 15 and protective film 5.

Plate-shaped object 2 is held in the edge region by a c during the entire detachment process. For this purpose, holding device 11 has, for example, two opposing hold-down devices, which clamp the plate-shaped object from both sides.

From FIG. 4 it can be seen that rod system 19 was moved with the rotary motion 17, as a result of which stamp 14 with its stamp surface 15 stood up, so that there is only contact of stamp 14 with adhesive tape 22 and protective film 5 in the area deflection roller 25. Part of adhesive tape 22 hangs "freely" between deflection roller 25 and adhesive tape collector 24.

FIG. 5 shows a first detachment of protective film 5 from the surface of plate-shaped object 2. First, deflection roller 23 was locked and adhesive tape collector 24 was rotated, as a result of which adhesive tape 22 is moved upwards with a tensile force, i. e. away from the surface of plate-shaped object 2 and protective film 5 is pulled upwards simultaneously. Contact arm 12 is then moved upwards in the direction of arrow 21. Protective film 5 adheres to adhesive tape 22 and is pulled upwards by the motion of contact arm 12 and thus further detaches from plate-shaped object 2.

After protective film 5 has been partially detached and lifted from plate-shaped object 2, a gripper 27 of a clamping device 26 swivels out in the direction of arrow 28. By means of clamping device 26, the detached protective film 5 is held and transferred to drum 3.

FIG. 6 shows a further swinging out of gripper 27 in the direction of arrow 28. There is preferably one gripper 27 on each side of drum 3, whereby protective film 5 is held in the lateral edge region.

FIG. 7 shows a final clamping of protective film 5 by clamping device 26.

FIG. 8 shows the transfer of detached protective film 5 to drum 3. Drum 3 has individual grooves 4 with which protective film 5 is held on the surface. By rotating drum 3, protective film 5 is peeled further off from plate-shaped object 2, plate-shaped object 2 being moved past drum 3 in the direction of arrow 10.

After protective film 5 has been peeled off from the plate-shaped object, contact arm 12 is swiveled away against the rotational motion 16 and simultaneously adhesive tape 22 is wound up by the adhesive tape collector synchronously with the swiveling motion of contact arm 12. Holding device 11 is then opened and releases plate-shaped object 2.

Clamping device 26 is shown in detail in FIGS. 9 and 10. Clamping device 26 consists of a driven shaft 29 which extends through drum 3.

According to FIG. 9, clamping device 26 has a slide guide which converts the rotary motion of the shaft into a vertical motion of a toggle lever. The toggle lever is connected to the gripper and clamps protective film 5, 6.

Based on FIG. 10 it can be seen that shaft 29 extends through drum 3, with clamping device 26 being arranged laterally next to drum 3. Gripper 26 is therefore actuated externally, i.e. outside of drum 3.

LIST OF REFERENCE NUMERALS

1. Device
2. Plate-shaped object
3. Drum
4. Outlet
5. Protective film
6. Protective film
7. Detachment device
8. Roller
9. Roller
10. Direction of arrow
11. Holding device
12. Contact arm
13. Contact head
14. Stamp
15. Stamp surface
16. Rotary motion
17. Rotary motion
18. Axis (of 12)
19. Rod system
20. Direction of arrow (lowering)
21. Direction of arrow (raising)
22. Adhesive tape
23. Tape dispenser deflection roller
24. Tape collector deflection roller
25. Deflection roller
26. Clamping device
27. Gripper
28. Direction of arrow of 27
29. Shaft
30. Slide guide
31. Arm (top)
32. Arm (bottom)
33. Holding device

The invention claimed is:

1. A device for peeling off at least one protective film from an object, the device comprising a detachment device with at least one roller exerting a pressure force on the protective film in an edge region of the object and thereby detaches the protective film, the protective film being at least partially lifted from the object with at least one adhesive tape and taken up by at least one drum in rotating motion, at least one swiveling contact arm, and a stamp arranged thereon having a stamp surface for applying the at least one adhesive tape.

2. The device according to claim 1, wherein the at least one adhesive tape can be guided over the stamp surface and can be at least partially contacted with the protective film.

3. The device according to claim 1, wherein the at least one adhesive tape can be guided from an adhesive tape dispenser over the stamp surface to an adhesive tape collector.

4. The device according to claim 1, wherein the contact arm has a contact head on which the stamp with its stamp surface is swivel-mounted.

5. The device according to claim 1, wherein the contact arm is arranged in an area of the drum and can be placed on the object by a drive and can be raised from the object.

6. The device according to claim 1, wherein the device has a clamping device with at least one gripper, which is arranged in an area of the drum for gripping the detached protective film and transferring it to the drum.

7. The device according to claim 6, wherein the clamping device has a driven shaft with a slide guide, the shaft extending through the drum, and the at least one gripper is designed as a toggle lever and closes or opens when the shaft is in rotating motion.

8. The device according to claim 1, wherein the detachment device has at least one smooth roller which is inclined relative to a rolling axis, the at least one roller causing friction on the protective film when moving in a longitudinal direction.

9. A method for peeling off at least one protective film from an object, the peeled at least one protective film being received by at least one drum, comprising the following steps:

lowering a contact arm with a stamp swivel-mounted thereon having a stamp surface in a direction of the object;

swiveling out the stamp until the stamp surface is parallel to the surface of the object, an adhesive tape being applied to the stamp surface when the stamp is swiveled out;

placing the stamp on the at least one protective film of the object and thus making surface contact of the adhesive tape with the at least one protective film;

swiveling in the stamp;

raising the contact arm at a defined distance from the object, the at least one protective film adhering to the adhesive tape and being lifted from the object;

gripping the peeled at least one protective film with at least one gripper of a clamping device;

transferring the peeled at least one protective film from the clamping device to the drum, which peels off the at least one protective film from the object.

10. The method according to claim 9, wherein the at least one protective film is detached by a detachment device in an edge region of the object, the detachment device having at least one smooth roller which is set at an angle, a tangential pressure force and a motion of the at least one roller in the longitudinal direction, parallel to the front edge of the object, causing friction on the at least one protective film.

* * * * *